(12) United States Patent
Al-Yami et al.

(10) Patent No.: US 10,053,611 B2
(45) Date of Patent: Aug. 21, 2018

(54) IN SITU GENERATION OF NANO-CLAY DRILLING FLUID

(71) Applicant: Saudi Arabian Oil Company, Dhahran (SA)

(72) Inventors: Abdullah Saleh Hussain Al-Yami, Dhahran (SA); Vikrant Bhavanishankar Wagle, Abqaiq (SA); Ziad Abdullrahman Saleh AlAbdullatif, Dhahran (SA); Faramak Almassi, Dhahran (SA); Abdulaziz S. Bubshait, Dhahran (SA); Ali Mohammed Hussain Al Safran, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 15/077,656

(22) Filed: Mar. 22, 2016

(65) Prior Publication Data
US 2017/0275519 A1    Sep. 28, 2017

(51) Int. Cl.
| | |
|---|---|
| *E21B 33/13* | (2006.01) |
| *E21B 43/22* | (2006.01) |
| *C09K 8/02* | (2006.01) |
| *C09K 8/24* | (2006.01) |
| *E21B 21/00* | (2006.01) |
| *C09K 8/18* | (2006.01) |
| *C09K 8/20* | (2006.01) |

(52) U.S. Cl.
CPC .............. *C09K 8/24* (2013.01); *C09K 8/18* (2013.01); *E21B 21/003* (2013.01); *C09K 8/203* (2013.01); *C09K 8/206* (2013.01); *C09K 2208/10* (2013.01); *C09K 2208/12* (2013.01)

(58) Field of Classification Search
CPC ... C09K 8/05; C09K 8/16; C09K 8/22; C09K 8/32; C09K 8/02; C09K 8/145; E21B 49/005; E21B 21/003; E21B 21/065; E21B 33/13
See application file for complete search history.

(56) References Cited

U.S. PATENT DOCUMENTS

| | | | |
|---|---|---|---|
| 3,668,123 A | 6/1972 | Steinberg | |
| 3,764,530 A | 10/1973 | Burland | |
| 3,880,764 A | 4/1975 | Donham | |
| 4,209,409 A | 6/1980 | Forster et al. | |
| 4,218,316 A * | 8/1980 | Watson | B01D 37/03 210/727 |

(Continued)

OTHER PUBLICATIONS

Abdou et al., "Evaluation of Egyptian Bentonite and Nano-Bentonite as Drilling Mud", Egyptian Journal of Petroleum, Published in 2013, pp. 53-59.

(Continued)

*Primary Examiner* — Zakiya W Bates
(74) *Attorney, Agent, or Firm* — Fish & Richardson P.C.

(57) ABSTRACT

A method includes adding a clay to water to form a suspension of clay in water, the clay including pieces of clay having an average diameter of at least 2 μm; adding a dispersant to the suspension of clay in water to form a drilling fluid; and injecting the drilling fluid into a well. In the drilling fluid, the dispersant interacts with the clay to form nanoscale particles of clay having an average diameter of less than 500 nm.

29 Claims, 7 Drawing Sheets

(56) References Cited

U.S. PATENT DOCUMENTS

| | | | |
|---|---|---|---|
| 4,425,244 A * | 1/1984 | House | C01B 33/44 |
| | | | 508/143 |
| 4,680,128 A | 7/1987 | Portnoy | |
| 4,711,731 A | 12/1987 | Garvey | |
| 5,360,787 A | 11/1994 | Bloys | |
| 5,424,283 A | 6/1995 | Miano | |
| 5,646,092 A | 7/1997 | Carminati | |
| 8,603,952 B2 | 12/2013 | Roddy et al. | |
| 8,685,903 B2 | 4/2014 | Ravi et al. | |
| 8,691,737 B2 | 4/2014 | Chatterji et al. | |
| 2009/0124522 A1 | 5/2009 | Roddy | |
| 2012/0015852 A1 | 1/2012 | Quintero et al. | |
| 2012/0211227 A1 | 8/2012 | Thaemlitz et al. | |

OTHER PUBLICATIONS

Agarwal et al., "Flow Behavior of Nanoparticle Stabilized Drilling Fluids and Effect of High Temperature Aging", American Association of Drilling Engineers, Published in 2011, 6 pages.

Mohammadi et al., "Studying Rheological Behavior of Nanoclay as Oil Well Drilling Fluid", Res Chem Intermed, Published online Sep. 21, 2013, 9 pages.

Abdo et al., "Nano-Enhanced Drilling Fluids: Pioneering Approach to Overcome Uncompromising Drilling Problems," Journal of Energy Resources Technology, vol. 134, No. 1, Mar. 2012, 6 pages.

International Search Report and Written Opinion issued in International Application No. PCT/US2017/020579 dated May 12, 2017.

* cited by examiner

IN SITU GENERATION OF NANO-CLAY DRILLING FLUID

BACKGROUND

Drilling fluids are used in oil and gas drilling to assist with lubricating the drill bit, ensuring well safety, forming filter cakes to minimize fluid loss into drilling formations, and transporting rock debris to the surface of the well. Clays, such as bentonite, are often added to drilling fluids to increase the viscosity of the drilling fluid, thus further reducing fluid loss to the drilling formation. In some cases, nano-scale particles of clay can be added to a drilling fluid to further improve the performance of the drilling fluid.

SUMMARY

In a general aspect, a method includes adding a clay to water to form a suspension of clay in water, the clay including pieces of clay having an average diameter of at least 2 micrometers (μm); adding a dispersant to the suspension of clay in water to form a drilling fluid; and injecting the drilling fluid into a well. In the drilling fluid, the dispersant interacts with the clay to form nanoscale particles of clay having an average diameter of less than 500 nanometers (nm).

Embodiments can have one or more of the following features.

The method includes soaking the clay in water for at least about 2 hours.

The clay includes bentonite.

The dispersant includes an anionic polymer. The dispersant includes chrome lignosulfonate, chrome-free lignosulfonate, or polyacrylamide. The dispersant includes one or more of anionic polyacrylates, polymers of allyloxybenzenesulfonate monomers, sulfonated isobutylene maleic anhydride copolymers, polymers containing maleic anhydride, complexes of aluminum and citric acid, sulfonated napthol compounds, azolignosulfonates, sodium acid pyrophosphate, and complexes of tetravalent zirconium and ligands of an organic acids.

The pH of the drilling fluid is between about 8 and about 12.5.

The method includes mixing the drilling fluid, wherein the dispersant interacts with the clay to form the nanoscale particles of clay during the mixing. The mixing occurs in the well. The mixing occurs prior to injecting the drilling fluid into the well.

Adding a dispersant includes adding a quantity of the dispersant such that a weight ratio of clay to dispersant in the drilling fluid is between 0.25 and 1.

Adding a dispersant includes adding a weight concentration of the dispersant in water of between 1% and 10%.

Adding a clay to water includes adding a weight concentration of the clay in water of between 0.1% and 10%.

The method includes adding a starch to the drilling fluid.

The method includes adding one or more of Xanthan gum biopolymer (XC-polymer), potassium chloride, potassium hydroxide, lime, a weighting agent, a shale inhibitor, sodium sulfite, polyanionic cellulose, caustic soda, and calcium chloride to the drilling fluid.

The drilling fluid including the nanoscale particles of clay has a plastic viscosity of less than about 60 centipoise (cP).

The drilling fluid including the nanoscale particles of clay has a yield point of at least 10 lb/100 ft² (pounds per one hundred square feet).

In the well, the drilling fluid including the nanoscale particles of clay forms a filter cake having a thickness of less than 6 millimeters (mm).

In an aspect, a drilling fluid is prepared by a process including adding a clay to water to form a suspension of clay in water, the clay including pieces of clay having an average diameter of at least 2 μm; adding a dispersant to the suspension of clay in water to form a drilling fluid; and injecting the drilling fluid into a well. In the drilling fluid, the dispersant interacts with the clay to form nanoscale particles of clay having an average diameter of less than 500 nm.

Embodiments can include one or more of the following features.

The process includes soaking the clay in water for at least 8 hours.

The clay includes bentonite.

The dispersant includes chrome lignosulfonate, chrome-free lignosulfonate, or polyacrylamide. The dispersant includes one or more of anionic polyacrylates, polymers of allyloxybenzenesulfonate monomers, sulfonated isobutylene maleic anhydride copolymers, polymers containing maleic anhydride, complexes of aluminum and citric acid, sulfonated napthol compounds, azolignosulfonates, sodium acid pyrophosphate, and complexes of tetravalent zirconium and ligands of an organic acid.

The process includes mixing the drilling fluid, wherein the dispersant interacts with the clay to form the nanoscale particles of clay during the mixing.

A weight ratio of clay to dispersant in the drilling fluid is between 0.25 and 1.

A weight concentration of the dispersant in water of between 1% and 10%.

A weight concentration of the clay in water of between 0.1% and 10%.

The drilling fluid includes starch.

The drilling fluid includes one or more of XC-polymer, potassium chloride, potassium hydroxide, lime, barite weighting agent, a shale inhibitor, sodium sulfite, polyanionic cellulose, caustic soda, and calcium chloride.

The approaches described here can have one or more of the following advantages. The in situ formation of nano-clay drilling fluids is a cost-effective way to access performance advantages provided by high surface area drilling fluids, such as improved fluid loss control, good rheological properties, high rate of penetration in drilling formations, and thin filter cake deposits leading to reduced differential pipe sticking.

Other features and advantages are apparent from the following description and from the claims.

DETAILED DESCRIPTION

We describe here an approach to in situ generation of nanoscale particles of clay in a drilling fluid. Large particles of conventional clay in the fluid are broken into nanoscale particles by interaction with a dispersant. A drilling fluid containing nanoscale particles of clay can thus be formed without external synthesis or acquisition of nanoparticles of clay.

Figure 1:
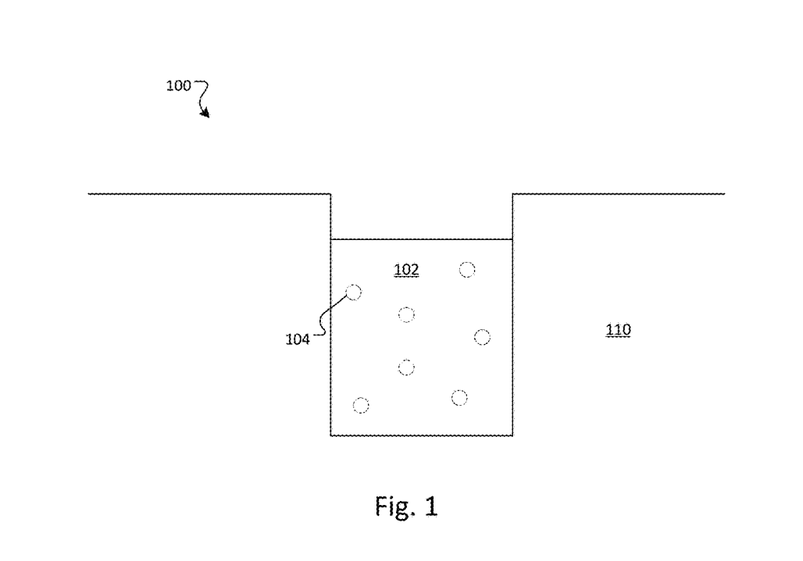
FIG. 1 is a diagram of a well.

Referring to FIG. 1, a drilling fluid 102 is injected into a well 100, such as an oil or natural gas well, in an oil or gas formation 110. Drilling fluid 102 can be a water-based drilling fluid, such as an aqueous mud, or an oil-based drilling fluid, such as an oil-based mud. Drilling fluid 102 includes nanoscale particles of clay 104 that can improve the rheological and filtration properties of drilling fluid 102. Drilling fluid 102 is sometimes referred to as a nano-clay drilling fluid. The nanoscale particles of clay 104 in drilling fluid 102 are formed in situ in the drilling fluid itself.

Figure 2:
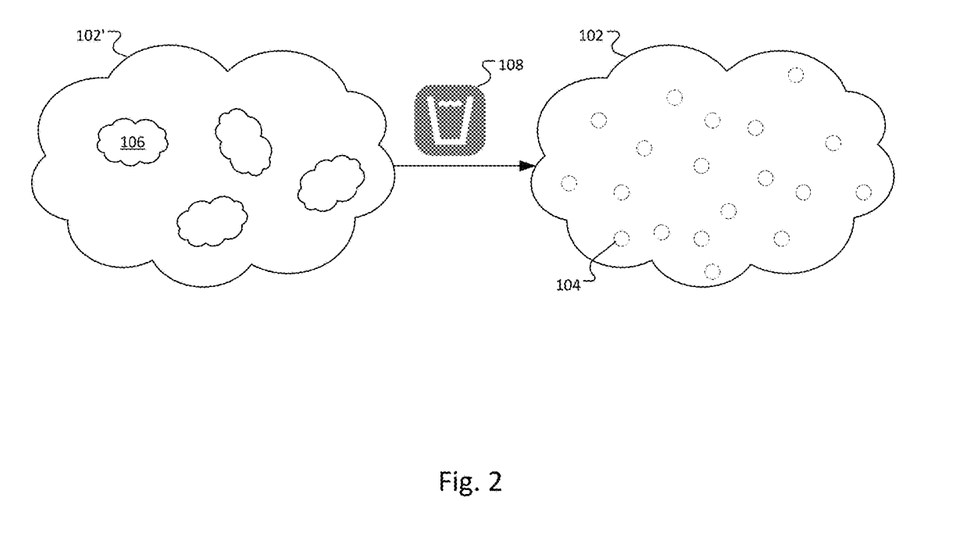
FIG. 2 is a diagram of a drilling fluid.

Referring also to FIG. 2, the formation of nanoscale particles of clay 104 occurs in situ in drilling fluid 102. An initial formulation 102' of drilling fluid includes large pieces of conventional clay 106. A dispersant 108 is added to the initial formulation 102' of drilling fluid. Interaction between dispersant 108 and large pieces of conventional clay 106 cause large pieces of conventional clay 106 to be broken up into nanoscale particles of clay 104. By enabling in situ formation of nanoscale particles of clay 104, a drilling fluid including nanoparticles can be created without having to synthesize or acquire nanoparticles of clay separately from the drilling fluid.

In some examples, dispersant 108 and the initial formulation of drilling fluid 102' are mixed in well 100 such that nanoscale particles of clay 104 are formed within the well. Without being bound by theory, it is believed that the high pressure, high temperature environment of the well hastens formation of nanoscale particles of clay 104. In some examples, dispersant 108 and the initial formulation of drilling fluid 102' are mixed prior to injection of drilling fluid into well 100. For instance, dispersant 108 and the initial formulation of drilling fluid 102' can be mixed in a mud plant or mud tank on a drilling rig.

The clay in drilling fluid 102 can be, for instance, bentonite, attapulgite, sepiolite, or other clays. Dispersant 108 in drilling fluid 102 is a material that is capable of dispersing clay. For instance, dispersant 108 can be a low molecular weight anionic polymer. Examples of dispersant 108 can include a lignosulfonate, for instance, chrome lignosulfonate or chrome-free lignosulfonate, low molecular weight polyacrylamides, anionic polyacrylates, polymers of allyloxybenzenesulfonate monomers, sulfonated isobutylene maleic anhydride copolymers, polymers containing maleic anhydride, complexes of aluminum and citric acid, sulfonated napthol compounds, azolignosulfonates, sodium acid pyrophosphate, or complexes of tetravalent zirconium and ligands from organic acids such as citric, tartaric, malic, or lactic acid.

Without being bound by theory, it is believed that the anionic nature of the dispersant interacts with the positive charges on the conventional clay, causing large pieces of conventional clay to be broken into nanoscale particles of clay. For instance, large pieces of conventional clay 106 in the initial formulation 102' of drilling fluid can have a diameter of at least about 1 µm, at least 2 µm, at least about 3 µm, at least about 4 µm, or at least about 5 µm. Upon in situ interaction with the dispersant, the large pieces of conventional clay 106 can be broken into nanoscale particles of clay 104 having a diameter of less than about 800 nm, less than about 600 nm, less than about 500 nm, less than about 400 nm, less than about 200 nm, less than about 100 nm, or less than about 50 nm.

Drilling fluid 102 can have a pH that is sufficient to enable dispersant 108 to react with conventional clay 106. For instance, drilling fluid 102 can have a pH of between about 8.0 and about 12.5, such as about 8.0, about 8.5, about 9.0, about 9.5, about 10.0, about 10.5, about 11.0, about 11.5, about 12.0, or about 12.5.

The weight concentration of conventional clay in a water-based drilling fluid can be between about 0.1 and about 10%, such as about 0.1%, about 0.5%, about 1%, about 2%, about 3%, about 4%, about 5%, about 6%, about 7%, about 8%, about 9%, or about 10%. The weight concentration of dispersant in a water-based drilling fluid can be between about 1% and about 10%, such as about 1%, about 2%, about 3%, about 4%, about 5%, about 6%, about 7%, about 8%, about 9%, or about 10%. The weight ratio of conventional clay to dispersant in a water-based drilling fluid can be between about 0.25 and 1, such as about 0.25, 0.3, 0.4, 0.5, about 0.6, about 0.7, about 0.8, about 0.9, or about 1. A smaller ratio of conventional clay to dispersant causes more of the conventional clay to be broken into nanoscale particles of clay.

Nano-clay drilling fluids can have improved rheological and filtration properties as compared to drilling fluids including conventional clay. For instance, nano-clay drilling fluids can have a higher yield point than drilling fluids including conventional clay. The yield point of a nano-clay drilling fluid depends on the components of the drilling fluid, such as the amount of a viscosifier in the drilling fluid. In some examples, nano-clay drilling fluids can have a yield point of at least 10 lb/100 ft$^2$, at least 20 lb/100 ft$^2$, at least 25 lb/100 ft$^2$, at least 30 lb/100 ft$^2$, at least 32 lb/100 ft$^2$, or another value. Nano-clay drilling fluids can form a filter cake that is thinner than a filter cake formed by drilling fluids including conventional clay. In some examples, nano-clay drilling fluids can form a filter cake having a thickness less than 2 mm, less than 3 mm, less than 4 mm, less than 5 mm, less than 6 mm, or another value. Nano-clay drilling fluids can have a plastic viscosity that is generally similar to the plastic viscosity of counterpart conventional clay drilling fluids. The plastic viscosity of a nano-clay drilling fluid depends on the components of the drilling fluid, such as the weight of the mud in the drilling fluid. In some examples, nano-clay drilling fluids can have a plastic viscosity of less than about 60 centipoise (cP), such as about 60 cP, about 50 cP, about 40 cP, about 30 cP, about 20 cP, about 22 cP, about 24 cP, about 26 cP, about 28 cP, about 30 cP, or another value. In some examples, a nano-clay drilling fluid having a high mudweight or a high density, such as a mudweight greater than about 120 pounds per cubic foot (pcf), can have a higher plastic viscosity than a nano-clay drilling fluid having a lower mudweight. For instance, a nano-clay drilling fluid having a mudweight of greater than about 120 pcf can have a plastic viscosity of up to about 60 cP and a nano-clay drilling fluid having a mudweight of less than about 120 pcf can have a plastic viscosity of up to about 40 cP.

Nano-clay drilling fluids can have improved fluid loss control and improved spurt loss control as compared to drilling fluids including conventional clay. For instance, nano-clay drilling fluids can inhibit shale swelling more effectively than drilling fluids including conventional clay, thus improving fluid control, reducing damage to the drilling formation, and leading to improved drilling performance. Without being bound by theory, it is believed that the enhanced performance of nano-clay drilling fluids is due at least in part to the high surface area of the clay in nano-clay drilling fluids.

Nano-clay drilling fluids can include additional components that can contribute to the stability of the nano-clay drilling fluid or improvements in the rheological or filtration properties of the nano-clay drilling fluid. For instance, nano-clay drilling fluids can include one or more of the following additional components: Xanthan gum biopolymer (XC-polymer), starch, potassium chloride, potassium hydroxide, lime, weighting agent, shale inhibitor, sodium sulfite, polyanionic cellulose, caustic soda, calcium chloride, or other components.

XC-polymer is a high molecular weight polysaccharide that is produced by fermentation of carbohydrate. XC-polymer is often used in drilling operations, for instance, as a viscosifier for oilfield drilling, workover, and completion fluids.

The starch in nano-clay drilling fluids can be native starch or modified starch and can be derived from natural sources such as potatoes, corn, wheat, or other sources. Starch can act as a filtration control additive that stabilizes the nano-clay drilling fluid. For instance, the presence of starch can result in a reduction in fluid loss to the surrounding formation, a thinner filter cake, or other improvements in performance. The inclusion of calcium carbonate in nano-clay drilling fluids can also stabilize the nano-clay drilling fluid, resulting in a reduction in fluid loss to the surrounding formation.

The nano-clay drilling fluid can include a weighting agent, such as barite, manganese tetroxide, hematite, dolomite, or another weighting agent. A weighting agent can be included to provide resistance to the high pressure exerted by the drilling formations in which a well is drilled.

The nano-clay drilling fluid can include a shale inhibitor, such as glycol ether, polyglycol, other polymers, or other materials. Shale inhibitors can help to slow or prevent the swelling and dispersion of shale in the drilling formations, thus improving the stability of the well.

In some examples, large pieces of conventional clay 106 are pre-hydrated prior to interaction with dispersant 108. For instance, large pieces of conventional clay 106 can be soaked in water for at least about 2 hours, at least about 4 hours, at least about 8 hours, at least about 12 hours, at least about 16 hours, or for another period of time. Without being bound by theory, it is believed that pre-hydration can make large pieces of conventional clay 106 more susceptible to being broken up by dispersant 108, for instance, by bringing positive charges to the surface of the pieces of conventional clay.

Figure 3:
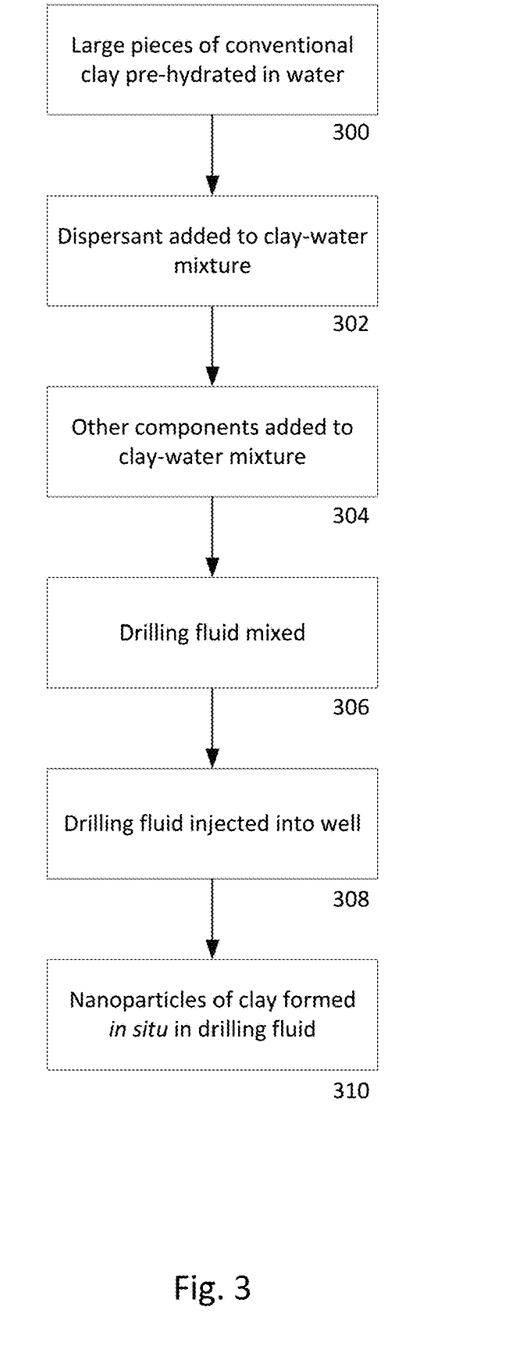
FIG. 3 is a flow chart.

Referring to FIG. 3, in a general process for in situ formation of nano-clay drilling fluid, large pieces of conventional clay, such as bentonite, are pre-hydrated (300) by soaking in water for at least about 2 hours, at least about 4 hours, at least about 8 hours, at least about 12 hours, at least about 16 hours, or for another period of time. A dispersant, such as a low molecular weight anionic polymer such as a lignosulfonate, for instance, chrome lignosulfonate, is added to the clay-water mixture (302). Other components of the drilling fluid can also be added to the clay-water mixture (304). The other components can include or more of the following: XC-polymer, starch, potassium chloride, potassium hydroxide, lime, barite, sodium sulfite, polyanionic cellulose, caustic soda, calcium chloride, or other components.

The drilling fluid including the hydrated bentonite, the dispersant, and any other additional components, is mixed (306) and injected into a well (308). In situ in the drilling fluid mixture, the dispersant breaks the large pieces of conventional clay into nanoscale particles of clay (310), resulting in the formation of nano-clay drilling fluid. In some examples, the nanoscale particles of clay are formed during the mixing and prior to injection into the well. In some examples, the nanoscale particles of clay are formed after the nano-clay drilling fluid has been injected into the well.

Example—Formulation and Characterization of Nano-Clay Drilling Fluids

Nano-clay drilling fluid was formed and characterized in comparison to conventional clay drilling fluid. Table 1 shows the composition of two formulations of drilling fluid with a density of 98 pounds per cubic foot (pcf), sometimes referred to as 98 pcf drilling fluid. Conventional drilling fluid, shown in the first column of Table 1, includes 4 lb of bentonite clay. Nano-clay drilling fluid, shown in the second column of Table 1, includes 4 lb of bentonite clay and 6 lb of chrome lignosulfonate dispersant. The presence of chrome lignosulfonate dispersant converts the bentonite into nanoscale bentonite particles. The composition of the two formulations of drilling fluid is otherwise substantially similar.

TABLE 1

Composition of 98 pcf conventional clay drilling fluid and nano-clay drilling fluid.

| Component | Conventional, 98 pcf | Nano-clay, 98 pcf |
| --- | --- | --- |
| Fresh water | 275.67 lb | 271.4 lb |
| Bentonite | 4 lb | 4 lb |
| Dispersant | 0 lb | 6 lb |
| XC-polymer | 1.5 lb | 1.5 lb |
| Starch | 6 lb | 6 lb |
| KCl | 20 lb | 20 lb |
| KOH | 0.25 lb | 0.25 lb |
| Lime | 0.25 lb | 0.25 lb |
| Barite | 241.56 lb | 239.84 lb |
| Sodium Sulfite | 0.2 lb | 0.2 lb |

To form 98 pcf drilling fluids with the compositions given in Table 1, 4 lb (pounds) of bentonite was pre-hydrated in water for about 16 hours. The remaining components listed in Table 1 were added to the pre-hydrated bentonite in the order given in Table 1 and mixed in stainless steel mixing cups on a five spindle multimixer model at 11500 rpm (revolutions per minute). In particular, to form 98 pcf conventional clay drilling fluid, the components chrome lignosulfonate, Xanthan gum biopolymer (XC-polymer), starch, potassium chloride (KCl), potassium hydroxide (KOH), lime, barite, and sodium sulfite were added to the pre-hydrated bentonite in that order and in the amounts given in Table 1. To form 98 pcf nano-clay drilling fluid, the components chrome lignosulfonate dispersant, XC-polymer, starch, KCl, KOH, lime, barite, and sodium sulfite were added to the pre-hydrated bentonite in that order and in the amounts given in Table 1.

Each drilling fluid formulation was aged in high pressure, high temperature stainless steels cells in a hot rolling oven at 265° F. for 16 hours. After hot rolling, each drilling fluid was again mixed on the multimixer for five minutes, after which the rheological and filtration properties of the drilling fluid were evaluated.

Figure 4:
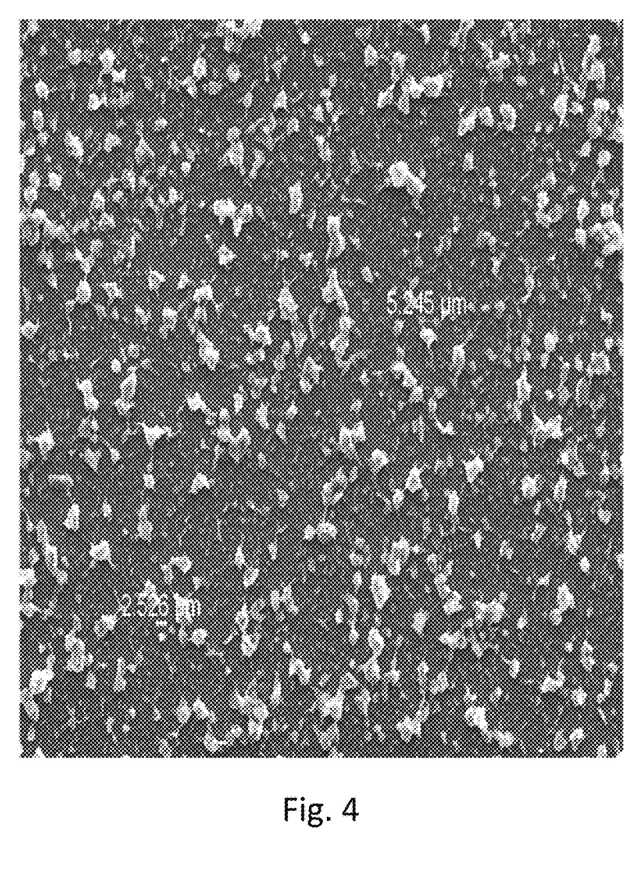
FIGS. 4 and 5 are scanning electron microscopy (SEM) images of conventional clay drilling fluid and nano-clay drilling fluid, respectively.
Figure 5:
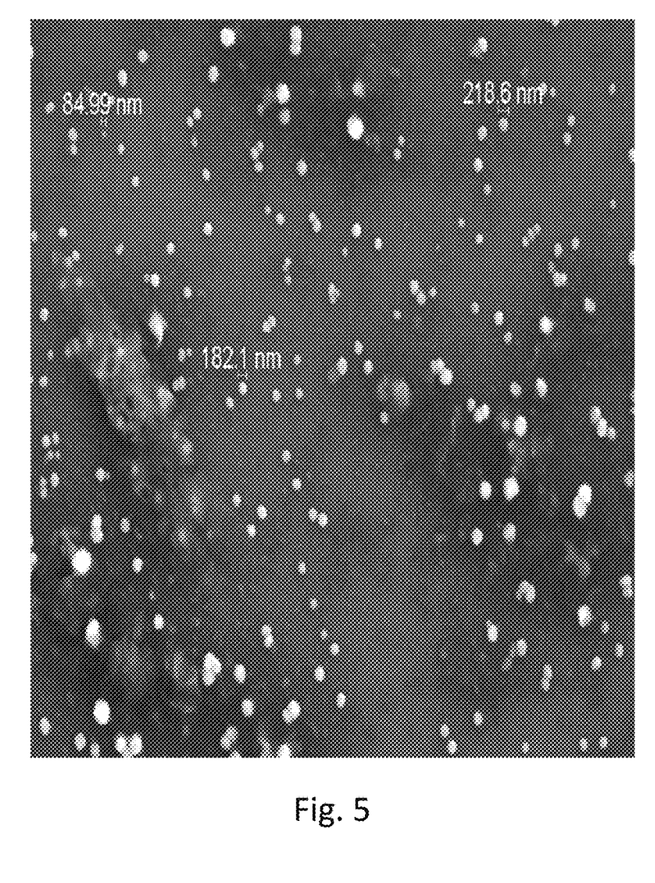

Referring to FIGS. 4 and 5, scanning electron microscopy (SEM) images were taken of 98 pcf conventional clay drilling fluid and 98 pcf nano-clay drilling fluid, respectively. Micron-size particles 100 of bentonite can be seen in the conventional clay drilling fluid. Nanoscale particles 102 of bentonite are present in the nano-clay drilling fluid. The presence of nanoscale particles of clay in the nano-clay drilling fluid demonstrates that the presence of chrome lignosulfonate dispersant can effectively convert conventional bentonite clay into nanoscale particles of clay.

Rheological and high pressure, high temperature (HPHT) fluid loss testing were performed according to the American Petroleum Institute (API) recommended practice 13B-1. The rheology of the drilling fluids was determined at 120° F. using a standard oilfield viscometer. The temperature of each drilling fluid was controlled in an electrically heated thermos cup. Plastic viscosity (PV) and yield point (YP) for each drilling fluid were calculated from the 600 and 300 rpm readings, respectively. The 10 second and 10 minute gel strengths of each drilling fluid were measured at 120° F. Fluid loss was determined in a 175 mL (milliliter) capacity HPHT filter press cell.

Table 2 shows the rheological and fluid loss properties of the 98 pcf conventional clay drilling fluid (column 1) and the 98 pcf nano-clay drilling fluid having the composition shown in Table 1. Relative to the performance of the conventional clay drilling fluid, the 98 pcf nano-clay drilling fluid demonstrates an improvement in fluid loss control of over 70%, a filter cake that is 59% thinner, an improvement in spurt loss control of over 66%. These results indicate a general improvement in the performance of the nano-clay drilling fluid when compared to conventional clay drilling fluid of otherwise similar composition.

TABLE 2

Rheological and fluid loss properties of 98 pcf conventional clay drilling fluid and nano-clay drilling fluid.

| Property | Conventional, 98 pcf | Nano-clay, 98 pcf |
| --- | --- | --- |
| Plastic viscosity, cP | 21 | 25.7 |
| Yield point | 18.1 | 19.2 |
| Gels, 10 second, lb/10 ft$^2$ | 7.1 | 7 |
| Gels, 10 minute, lb/10 ft$^2$ | 24.6 | 26.2 |
| pH | 8.2 | 8.29 |
| HPHT filtrate, 265° F., mL | 84 | 23 |
| Cake thickness, mm | 14.3 | 5.9 |
| Spurt loss | 6 | 2 |

Figure 6:
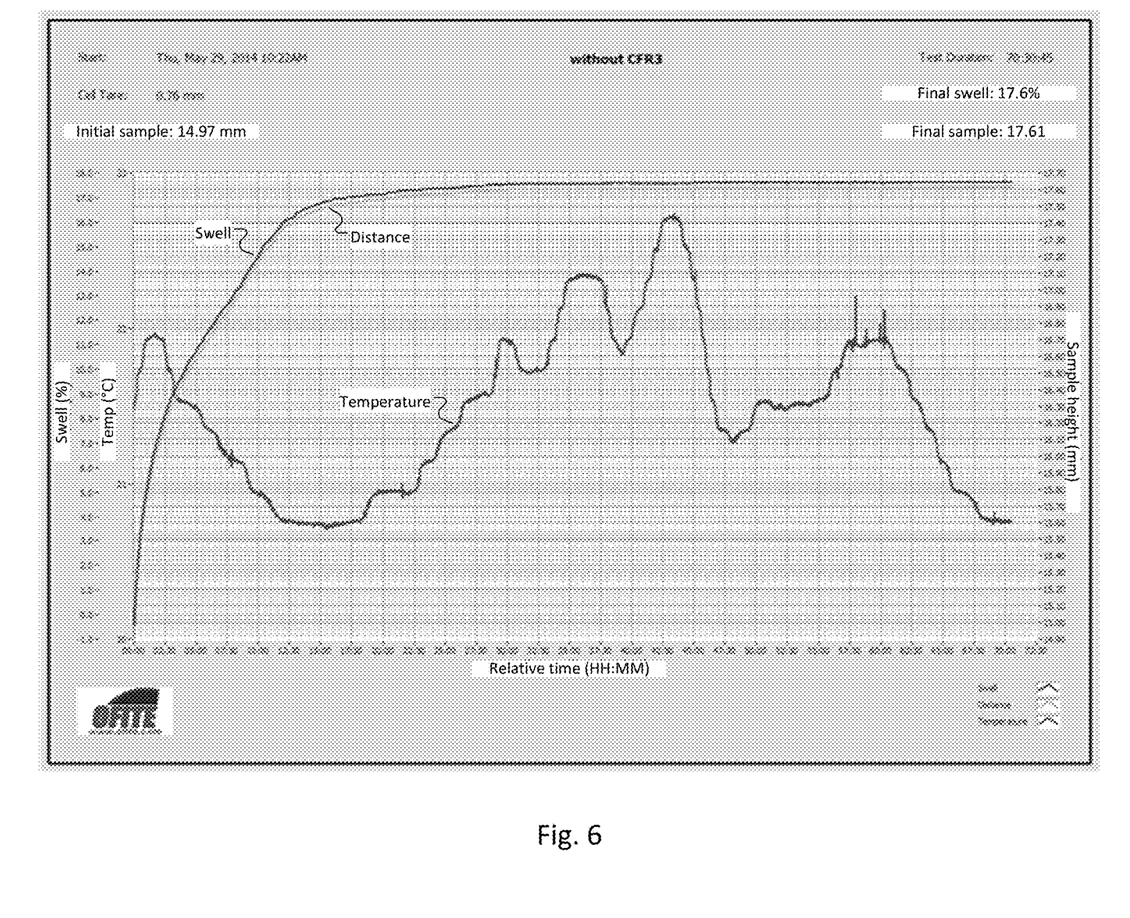
FIGS. 6 and 7 are plots of the results of shale swelling tests using conventional clay drilling fluid and nano-clay drilling fluid, respectively.
Figure 7:
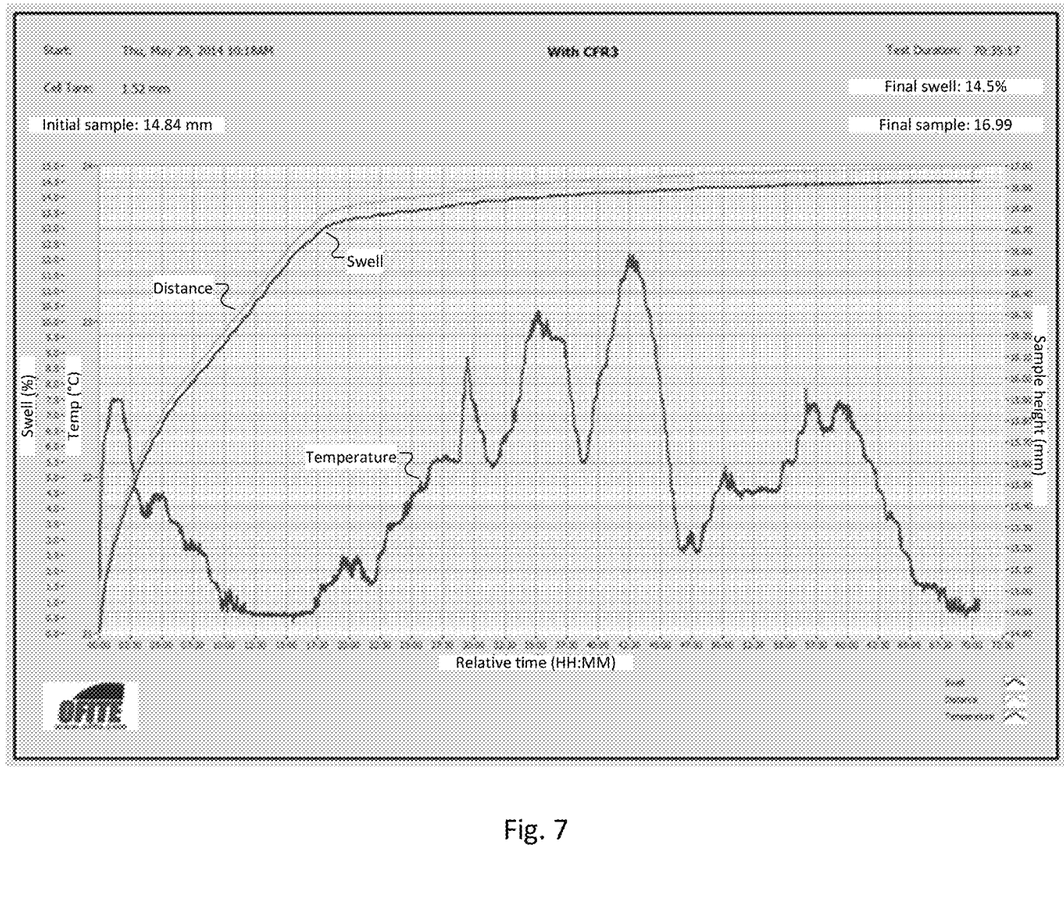

Referring to FIGS. 6 and 7, shale swelling tests were performed for 98 pcf conventional clay drilling fluid and 98 pcf nano-clay drilling fluid, respectively. Conventional clay drilling fluid resulted in a final swell of 17.6%, while nano-clay drilling fluid resulted in a final swell of 14.5%, indicating that the use of nano-clay drilling fluid improves shale inhibition by 8% as compared to conventional clay drilling fluid.

In a shale swelling test, a sample of shale, such as shale from a target well site, is placed in a drilling fluid. The reactivity of the shale to the drilling fluid is determined based on the degree of swelling of the shale. To prepare shale samples for the shale swelling test, a sample of shale was placed into an oven set at 100° C. for at least 8 hours, or overnight, to dry the shale. The dried sample was ground using a mortar and pestle until pulverized and sieved through a 200 mesh sieve. 5% (weight:weight) water was added slowly to the sieved shale while grinded. 20 g of sieved shale with added water was weighed for each formulation of drilling fluid to be tested.

Each shale swelling test was conducted using a compactor. The 20 g sample of shale was placed into a core chamber between two acrylic discs. The chamber was attached to a hydraulic cylinder of the compactor, aligned as appropriate, and pressurized to the desired pressure for two hours. The compacted core of shale and was removed from the compactor and placed into the drilling formulation to be tested. The swelling of the shale was measured until no further swelling occurred, generally after about 8 hours or overnight.

Table 3 shows the composition of two formulations of low density, 66 pcf drilling fluid. Conventional drilling fluid, shown in the first column of Table 3, includes 5 lb of bentonite clay. Nano-clay drilling fluid, shown in the second column of Table 3, includes 5 lb of bentonite clay and 5 lb of chrome lignosulfonate dispersant. The composition of the two formulations of drilling fluid is otherwise substantially similar.

TABLE 3

Composition of 66 pcf conventional clay drilling fluid and nano-clay drilling fluid.

| Component | Conventional, 66 pcf | Nano-clay, 66 pcf |
| --- | --- | --- |
| Fresh water | 334.16 | 330.60 |
| Bentonite | 5 | 5 |
| Dispersant | 0 | 5 |
| XC-polymer | 0.75 | 0.75 |
| Starch | 4 | 4 |
| PAC | 1.5 | 1.5 |
| KCl | 10 | 10 |
| Caustic soda | 0.3 | 0.3 |
| CaCO$_3$ fine | 5 | 5 |
| CaCO$_3$ medium | 5 | 5 |
| Barite | 4.31 | 2.87 |

To form 66 pcf drilling fluids with the compositions given in Table 3, 5 lb of bentonite was pre-hydrated in water for about 16 hours. The remaining components listed in Table 3 were added to the pre-hydrated bentonite in the order given in Table 3 and mixed in stainless steel mixing cups on a five spindle multimixer model at 11500 rpm. In particular, to form 66 pcf conventional clay drilling fluid, chrome lignosulfonate, XC-polymer, starch, polyanionic cellulose (PAC), KCl, caustic soda, fine calcium carbonate (CaCO$_3$), medium calcium carbonate, and barite were added to the pre-hydrated bentonite in that order and in the amounts given in Table 3.

Each drilling fluid formulation was aged in HPHT stainless steel cells in a hot rolling oven at 150° F. for 16 hours. After hot rolling, each drilling fluid was again mixed on the multimixer for five minutes, after which the rheological and filtration properties of the drilling fluid were evaluated according to the testing procedures described above.

Table 4 shows the rheological and fluid loss properties of the 66 pcf conventional clay drilling fluid (column 1) and the 66 pcf nano-clay drilling fluid (column 2) having the composition shown in Table 3. Relative to the performance of the conventional clay drilling fluid, the 66 pcf nano-clay drilling fluid demonstrates improvements in fluid loss control, spurt loss control, and yield point. The plastic viscosity of the 66 pcf nano-clay drilling fluid stayed generally similar to the plastic viscosity of the conventional clay drilling fluid. These results indicate a general improvement in the performance of the nano-clay drilling fluid when compared to conventional clay drilling fluid of otherwise similar composition.

TABLE 4

Rheological and fluid loss properties of 66 pcf conventional clay drilling fluid and nano-clay drilling fluid.

| Property | Conventional, 66 pcf | Nano-clay, 66 pcf |
|---|---|---|
| Plastic viscosity, cP | 21 | 25 |
| Yield point | 29 | 34 |
| Gels, 10 second, lb/10 ft$^2$ | 5 | 6 |
| Gels, 10 minute, lb/10 ft$^2$ | 19 | 17 |
| pH | 10.45 | 10.52 |
| API fluid loss, 30 min | 12 | 6 |
| Cake thickness, in | 3/64$^{th}$ | 3/64$^{th}$ |

Figure 8:
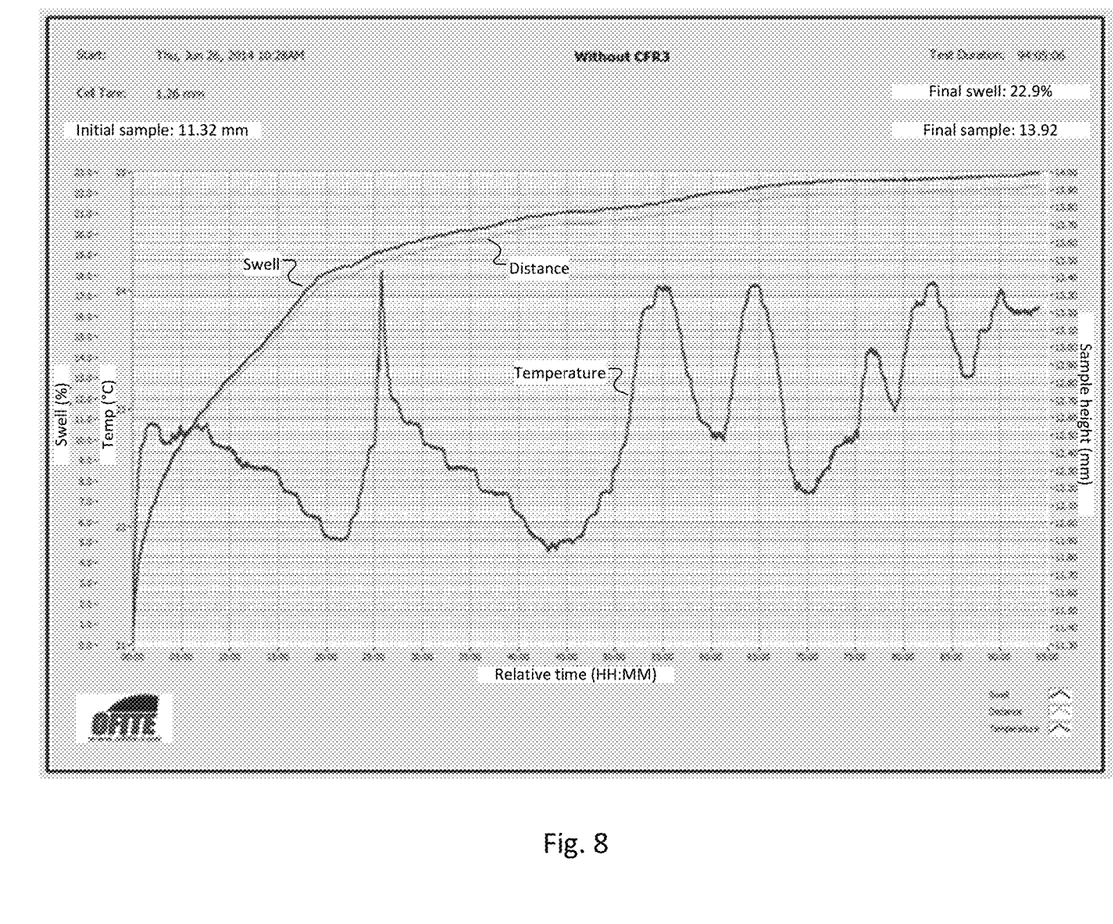
FIGS. 8 and 9 are plots of the results of shale swelling tests using conventional clay drilling fluid and nano-clay drilling fluid, respectively.
Figure 9:
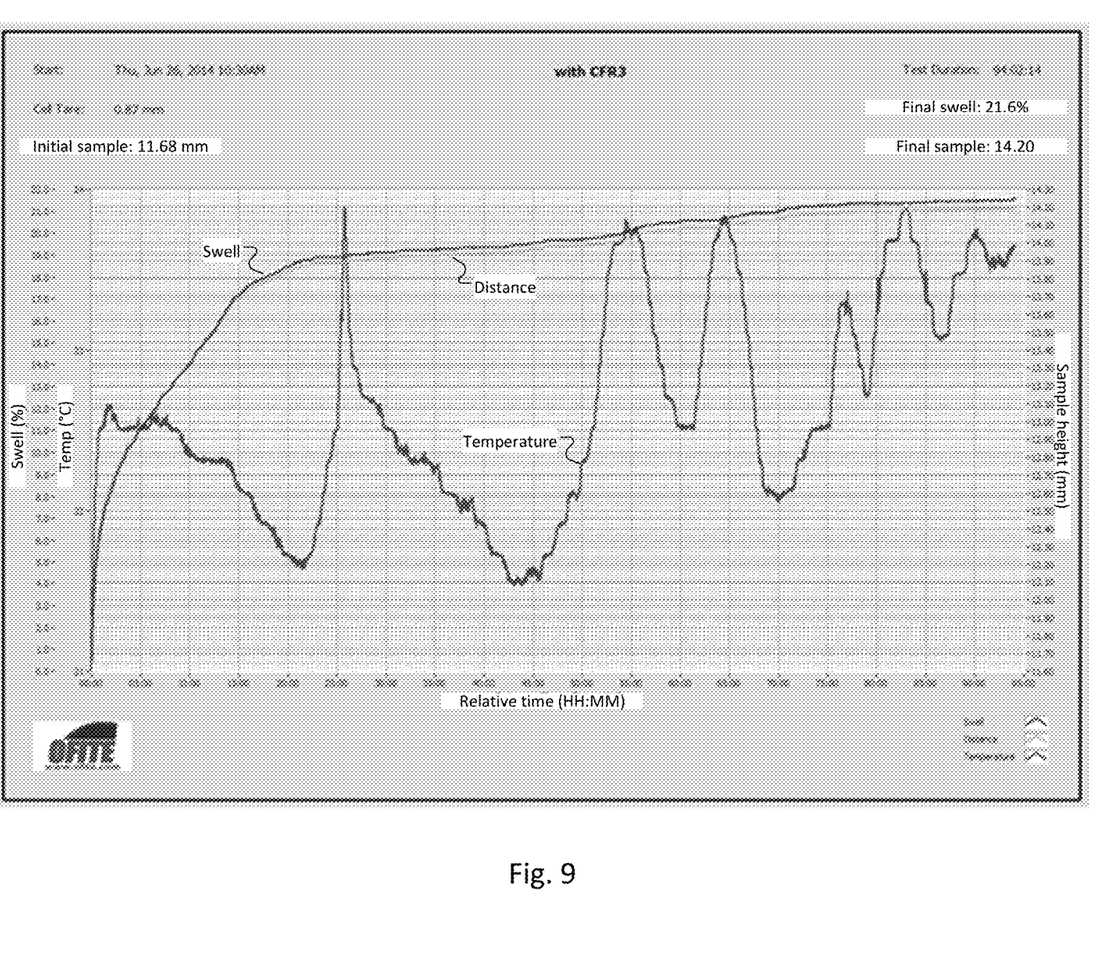

Referring to FIGS. 8 and 9, shale swelling tests were performed for 66 pcf conventional clay drilling fluid and 66 pcf nano-clay drilling fluid, respectively, according to the testing procedure described above. Conventional clay drilling fluid resulted in a final swell of 22.9%, while nano-clay drilling fluid resulted in a final swell of 21.6%, indicating that the use of nano-clay drilling fluid improves shale inhibition by 6% as compared to conventional clay drilling fluid.

Embodiment 1 is directed to a method including adding a clay to water to form a suspension of clay in water, the clay including pieces of clay having an average diameter of at least 2 µm; adding a dispersant to the suspension of clay in water to form a drilling fluid; and injecting the drilling fluid into a well. In the drilling fluid, the dispersant interacts with the clay to form nanoscale particles of clay having an average diameter of less than 500 nm.

Embodiment 2 is directed to embodiment 1, and includes soaking the clay in water for at least about 2 hours.

Embodiment 3 is directed to any of the preceding embodiments, wherein the clay includes bentonite.

Embodiment 4 is directed to any of the preceding embodiments, wherein the dispersant includes an anionic polymer.

Embodiment 5 is directed to any of the preceding embodiments, wherein the dispersant includes chrome lignosulfonate or a chrome-free lignosulfonate.

Embodiment 6 is directed to any of the preceding embodiments, wherein the dispersant includes a polyacrylamide.

Embodiment 7 is directed to any of the preceding embodiments, wherein the dispersant includes one or more of anionic polyacrylates, polymers of allyloxybenzenesulfonate monomers, sulfonated isobutylene maleic anhydride copolymers, polymers containing maleic anhydride, complexes of aluminum and citric acid, sulfonated napthol compounds, azolignosulfonates, sodium acid pyrophosphate, or complexes of tetravalent zirconium and ligands of an organic acid.

Embodiment 8 is directed to any of the preceding embodiments, wherein the pH of the drilling fluid is between about 8 and about 12.5.

Embodiment 9 is directed to any of the preceding embodiments, and includes mixing the drilling fluid, wherein the dispersant interacts with the clay to form the nanoscale particles of clay during the mixing.

Embodiment 10 is directed to embodiment 9, wherein the mixing occurs in the well.

Embodiment 11 is directed to embodiment 8, wherein the mixing occurs prior to injecting the drilling fluid into the well.

Embodiment 12 is directed to any of the preceding embodiments, wherein adding a dispersant includes adding a quantity of the dispersant such that a weight ratio of clay to dispersant in the drilling fluid is between 0.25 and 1.

Embodiment 13 is directed to any of the preceding embodiments, wherein adding a dispersant includes adding a weight concentration of the dispersant in water of between 1% and 10%.

Embodiment 14 is directed to any of the preceding embodiments, wherein adding a clay to water includes adding a weight concentration of the clay in water of between 0.1% and 10%.

Embodiment 15 is directed to any of the preceding embodiments, and includes adding a starch to the drilling fluid.

Embodiment 16 is directed to any of the preceding embodiments, and includes adding one or more of XC-polymer, potassium chloride, potassium hydroxide, lime, a weighting agent, a shale inhibitor, sodium sulfite, polyanionic cellulose, caustic soda, and calcium chloride to the drilling fluid.

Embodiment 17 is directed to any of the preceding embodiments, wherein the drilling fluid including the nanoscale particles of clay has a plastic viscosity of less than about 60 cP.

Embodiment 18 is directed to any of the preceding embodiments, wherein the drilling fluid including the nanoscale particles of clay has a yield point of at least 10 lb/100 ft2.

Embodiment 19 is directed to any of the preceding embodiments, wherein in the well, the drilling fluid including the nanoscale particles of clay forms a filter cake having a thickness of less than 6 mm.

Embodiment 20 is directed to a drilling fluid prepared by a process including adding a clay to water to form a suspension of clay in water, the clay including pieces of clay having an average diameter of at least 2 µm; adding a dispersant to the suspension of clay in water to form a drilling fluid; and injecting the drilling fluid into a well. In the drilling fluid, the dispersant interacts with the clay to form nanoscale particles of clay having an average diameter of less than 500 nm.

Embodiment 21 is directed to embodiment 20, wherein the process includes soaking the clay in water for at least 2 hours.

Embodiment 22 is directed to embodiment 20 or 21, wherein the clay includes bentonite.

Embodiment 23 is directed to any of embodiments 20 to 22, wherein the dispersant includes chrome lignosulfonate or chrome-free lignosulfonate.

Embodiment 24 is directed to any of embodiments 20 to 23, wherein the dispersant includes polyacrylamide.

Embodiment 25 is directed to any of embodiments 20 to 24, wherein the dispersant includes one or more of anionic polyacrylates, polymers of allyloxybenzenesulfonate monomers, sulfonated isobutylene maleic anhydride copolymers, polymers containing maleic anhydride, complexes of aluminum and citric acid, sulfonated napthol compounds, azolignosulfonates, sodium acid pyrophosphate, and complexes of tetravalent zirconium and ligands of an organic acid.

Embodiment 26 is directed to any of embodiments 20 to 25, wherein the process includes mixing the drilling fluid, wherein the dispersant interacts with the clay to form the nanoscale particles of clay during the mixing.

Embodiment 27 is directed to any of embodiments 20 to 26, wherein a weight ratio of clay to dispersant in the drilling fluid is between 0.25 and 1.

Embodiment 28 is directed to any of embodiments 20 to 27, wherein a weight concentration of the dispersant in water of between 1% and 10%.

Embodiment 29 is directed to any of embodiments 20 to 28, wherein a weight concentration of the clay in water of between 0.1% and 10%.

Embodiment 30 is directed to any of embodiments 20 to 29, wherein the drilling fluid includes starch.

Embodiment 31 is directed to any of embodiments 20 to 30, wherein the drilling fluid includes one or more of XC-polymer, potassium chloride, potassium hydroxide, lime, barite weighting agent, a shale inhibitor, sodium sulfite, polyanionic cellulose, caustic soda, and calcium chloride.

Other implementations are also within the scope of the following claims.

What is claimed is:

1. A method comprising:
adding a clay to water to form a suspension of clay in water, the clay including pieces of clay having an average diameter of at least 2 µm;
adding a dispersant to the suspension of clay in water to form a drilling fluid having a weight ratio of clay to dispersant of between 0.25 and 1; and
injecting the drilling fluid into a well;
wherein in the drilling fluid, the dispersant interacts with the clay to form nanoscale particles of clay having an average diameter of less than 500 nm.

2. The method of claim 1, comprising soaking the clay in water for at least about 2 hours.

3. The method of claim 1, wherein the clay comprises bentonite.

4. The method of claim 1, wherein the dispersant comprises an anionic polymer.

5. The method of claim 1, wherein the dispersant comprises chrome lignosulfonate or a chrome-free lignosulfonate.

6. The method of claim 1, wherein the dispersant comprises a polyacrylamide.

7. The method of claim 1, wherein the dispersant comprises one or more of anionic polyacrylates, polymers of allyloxybenzenesulfonate monomers, sulfonated isobutylene maleic anhydride copolymers, polymers containing maleic anhydride, complexes of aluminum and citric acid, sulfonated napthol compounds, azolignosulfonates, sodium acid pyrophosphate, and complexes of tetravalent zirconium and ligands of an organic acid.

8. The method of claim 1, wherein the pH of the drilling fluid is between about 8 and about 12.5.

9. The method of claim 8, wherein the mixing occurs prior to injecting the drilling fluid into the well.

10. The method of claim 1, comprising mixing the drilling fluid, wherein the dispersant interacts with the clay to form the nanoscale particles of clay during the mixing.

11. The method of claim 10, wherein the mixing occurs in the well.

12. The method of claim 1, wherein adding a dispersant comprises adding a weight concentration of the dispersant in water of between 1% and 10%.

13. The method of claim 1, wherein adding a clay to water comprises adding a weight concentration of the clay in water of between 0.1% and 10%.

14. The method of claim 1, comprising adding a starch to the drilling fluid.

15. The method of claim 1, comprising adding one or more of XC-polymer, potassium chloride, potassium hydroxide, lime, a weighting agent, a shale inhibitor, sodium sulfite, polyanionic cellulose, caustic soda, and calcium chloride to the drilling fluid.

16. The method of claim 1, wherein the drilling fluid including the nanoscale particles of clay has a plastic viscosity of less than about 60 cP.

17. The method of claim 1, wherein the drilling fluid including the nanoscale particles of clay has a yield point of at least 10 lb/100 ft$^2$.

18. The method of claim 1, wherein in the well, the drilling fluid including the nanoscale particles of clay forms a filter cake having a thickness of less than 6 mm.

19. A drilling fluid prepared by a process comprising:
adding a clay to water to form a suspension of clay in water, the clay including pieces of clay having an average diameter of at least 2 µm;
adding a dispersant to the suspension of clay in water to form a drilling fluid; and
injecting the drilling fluid into a well;
wherein in the drilling fluid:
the dispersant interacts with the clay to form nanoscale particles of clay having an average diameter of less than 500 nm; and
a weight ratio of clay to dispersant is between 0.25 and 1.

20. The drilling fluid of claim 19, wherein the process comprises soaking the clay in water for at least 2 hours.

21. The drilling fluid of claim 19, wherein the clay comprises bentonite.

22. The drilling fluid of claim 19, wherein the dispersant comprises chrome lignosulfonate or chrome-free lignosulfonate.

23. The drilling fluid of claim 19, wherein the dispersant comprises polyacrylamide.

24. The drilling fluid of claim 19, wherein the dispersant comprises one or more of anionic polyacrylates, polymers of allyloxybenzenesulfonate monomers, sulfonated isobutylene maleic anhydride copolymers, polymers containing maleic anhydride, complexes of aluminum and citric acid, sulfonated napthol compounds, azolignosulfonates, sodium acid pyrophosphate, and complexes of tetravalent zirconium and ligands of an organic acid.

25. The drilling fluid of claim 19, wherein the process comprises mixing the drilling fluid, wherein the dispersant interacts with the clay to form the nanoscale particles of clay during the mixing.

26. The drilling fluid of claim 19, wherein a weight concentration of the dispersant in water of between 1% and 10%.

27. The drilling fluid of claim 19, wherein a weight concentration of the clay in water of between 0.1% and 10%.

28. The drilling fluid of claim 19, wherein the drilling fluid comprises starch.

29. The drilling fluid of claim 19, wherein the drilling fluid comprises one or more of XC-polymer, potassium chloride, potassium hydroxide, lime, barite weighting agent, a shale inhibitor, sodium sulfite, polyanionic cellulose, caustic soda, and calcium chloride.

* * * * *

UNITED STATES PATENT AND TRADEMARK OFFICE
CERTIFICATE OF CORRECTION

PATENT NO. : 10,053,611 B2
APPLICATION NO. : 15/077656
DATED : August 21, 2018
INVENTOR(S) : Abdullah Saleh Hussain Al-Yami et al.

It is certified that error appears in the above-identified patent and that said Letters Patent is hereby corrected as shown below:

In the Claims

Column 11, Line 42, Claim 7, delete "napthol" and insert --naphthol--.

Column 12, Line 42, Claim 24, delete "napthol" and insert --naphthol--.

Signed and Sealed this
Twenty-second Day of January, 2019

Andrei Iancu
*Director of the United States Patent and Trademark Office*